(12) United States Patent
Hou et al.

(10) Patent No.: US 10,104,713 B2
(45) Date of Patent: Oct. 16, 2018

(54) METHOD OF FORMING ACCESS NETWORK, AND ACCESS NETWORK SYSTEM

(71) Applicant: ZTE CORPORATION, Guangdong (CN)

(72) Inventors: Xiaohui Hou, Guangdong (CN); Bin Xiao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/512,327

(22) PCT Filed: Jan. 23, 2015

(86) PCT No.: PCT/CN2015/071414
§ 371 (c)(1),
(2) Date: Mar. 17, 2017

(87) PCT Pub. No.: WO2015/131698
PCT Pub. Date: Sep. 11, 2015

(65) Prior Publication Data
US 2017/0280505 A1    Sep. 28, 2017

(30) Foreign Application Priority Data
Sep. 17, 2014   (CN) .......................... 2014 1 0475550

(51) Int. Cl.
*H04W 84/04*     (2009.01)
*H04W 16/32*     (2009.01)
(Continued)

(52) U.S. Cl.
CPC ....... *H04W 84/042* (2013.01); *H04L 12/2856* (2013.01); *H04L 41/50* (2013.01);
(Continued)

(58) Field of Classification Search
CPC ... H04W 88/08; H04W 16/32; H04W 84/045; H04W 36/04; H04W 76/15
See application file for complete search history.

(56) References Cited

U.S. PATENT DOCUMENTS

| 9,282,445 | B2 * | 3/2016 | Moreno | .................. H04W 4/20 |
| 9,854,455 | B2 * | 12/2017 | Lee | ......................... H04W 16/32 |
| 2017/0215078 | A1 * | 7/2017 | Mochizuki | ............ H04W 16/06 |

FOREIGN PATENT DOCUMENTS

| CN | 101981974 A | 2/2011 |
| CN | 103874046 A | 6/2014 |

OTHER PUBLICATIONS

International Search Report dated Jun. 11, 2015 issued in PCT/CN2015/071414.

* cited by examiner

*Primary Examiner* — Nam Huynh
(74) *Attorney, Agent, or Firm* — Scully Scott Murphy & Presser

(57) ABSTRACT

A method for implementing networking of an access network includes: implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell, where the neighboring cells include another distributed cell, a conventional cell.

9 Claims, 2 Drawing Sheets

(51) Int. Cl.
    *H04W 76/40*        (2018.01)
    *H04W 8/02*         (2009.01)
    *H04L 12/24*        (2006.01)
    *H04L 29/06*        (2006.01)
    *H04L 12/28*        (2006.01)
    *H04W 76/00*        (2018.01)

(52) U.S. Cl.
    CPC ............... *H04L 63/10* (2013.01); *H04W 8/02* (2013.01); *H04W 16/32* (2013.01); *H04W 76/002* (2013.01); *H04W 76/40* (2018.02); *H04W 84/045* (2013.01)

METHOD OF FORMING ACCESS NETWORK, AND ACCESS NETWORK SYSTEM

CROSS-REFERENCE TO RELATED APPLICATIONS

This application is the 371 application of PCT Application No. PCT/CN2015/071414 filed Jan. 23, 2015, which is based upon and claims priority to Chinese Patent Application No. 201410475550.9, filed Sep. 17, 2014, the entire contents of which are incorporated herein by reference.

TECHNICAL FIELD

The present application relates to technology of wireless communication networking, and more particularly to a method for implementing networking of an access network and an access network system.

BACKGROUND

With the development of wireless communication, especially in large-scale popularization of the 4G technology and the future 5G technology, the wireless cell distribution presents a variety of structures. For example, there are many vertical distribution structures in wireless communication network, such as macro cells, small cells, microcells, picocells and the like.

The base station in the LTE (Long Term Evolution) system is currently connected directly to the core network (CN). Base stations of respective cells in the network are connected to the CN via the S1 port. With continuous increase of small cells distribution in the network, if the communication structure of small cell, in which the base station is directly connected to CN, is still adopted, the increased small cells may be interconnected with other cells of the system, which goes against the collaborative management of small cells, affecting the effective handling of communication data.

This section provides background information related to the present disclosure which is not necessarily prior art.

SUMMARY

Embodiments of the present disclosure provide a method for implementing networking of an access network and an access network system according to the disclosure, such that the small cells can be managed effectively and collaboratively, and that the communication data can be processed effectively.

In order to achieve the above object, embodiments of the present disclosure provide a method for implementing networking of an access network. The method includes:

implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell;

wherein the neighboring cells include another distributed cell, a conventional cell.

In an embodiment, the macro coverage cell is connected with each small cell in the distributed cell via an X2 interface; the small cells are connected with each other through the macro coverage cell in the distributed cell; and the each small cell is connected and communicates with the conventional cell or CN through the macro coverage cell; the distributed cell is connected with the another distributed cell via an X2 interface; and the distributed cell is connected with the conventional cell or CN via an S1 interface of the macro coverage cell corresponding to the distributed cell.

In an embodiment, a macro base station of the distributed cell is configured to establish a data transmission channel between the macro base station and a small base station of the small cell when a user equipment (UE) initiates a service in the small cell of the distributed cell.

In an embodiment, a return bandwidth of each macro coverage cell is determined by radio resource condition of respective small cells in the distributed cell corresponding to the macro coverage cell.

In an embodiment, each distributed cell further includes a backup macro coverage cell for hot spare, and the backup macro coverage cell and the macro coverage cell in the distributed cell work simultaneously.

In an embodiment, transmission of data stream is performed by the macro coverage cell in the distributed cell when a user equipment UE of the small cell in the distributed cell is switched between different distributed cells.

In an embodiment, a macro base station of the macro coverage cell in the distributed cell performs cooperative transmission by means of several small cells in the distributed cell, the cooperative transmission including:

the macro base station performs the cooperative transmission by selecting the several small cells whose channels are not correlated and network load is low according to downlink measurement of the UE, uplink measurement of the macro base station, and network load condition of the small cells; and uplink of the distributed cell is performed by aggregating radio frequency data, intermediate frequency data or baseband data of the small cells in cooperative transmission into related modules of the macro base station for processing, and the processed uplink data is transmitted via the S1 interface of the macro base station; and downlink of the distributed cell is performed by transmitting baseband data to each small cell in cooperative transmission for implementing conversion of the baseband data to radio frequency signal.

In an embodiment, the threshold is 10.

According to another aspect, embodiments of the present disclosure provide an access network system, including a distributed cell, neighboring cells of the distributed cell and core network CN; wherein, the distributed cell is formed by implementing networking of a macro coverage cell and small cells within a range covered by the macro coverage cell, where number of the small cells within the range covered by the macro coverage cell reaches a threshold, and each small cell in the distributed cell is configured to communicate with the neighboring cells or CN through the macro coverage cell in the distributed cell;

the neighboring cells are configured to communicate with the small cells in the distributed cell through the macro coverage cell in the distributed cell; and the CN is configured to communicate with the small cells in the distributed cell through the macro coverage cell in the distributed cell; and wherein the neighboring cells include another distributed cell and a conventional cell.

In an embodiment, the macro coverage cell in the distributed cell is connected with each small cell in the distributed cell via an X2 interface; the each small cell is connected and communicates with the conventional cell or CN through the macro coverage cell;

the distributed cell is connected with the another distributed cell via an X2 interface; and the distributed cell is connected with the conventional cell or CN via an S1 interface of the macro coverage cell corresponding to the distributed cell.

In an embodiment, a macro base station of the distributed cell is configured to establish a data transmission channel between the macro base station and a small base station of the small cell when a user equipment UE initiates a service in the small cell of the distributed cell.

In an embodiment, the macro coverage cell includes a return bandwidth module configured to determine a return bandwidth according to radio resource condition of respective small cells in the distributed cell.

In an embodiment, the distributed cell further includes a backup macro coverage cell for hot spare configured to work simultaneously with the macro coverage cell in the distributed cell.

In an embodiment, the macro coverage cell is further configured to perform transmission of data stream when a user equipment UE of the small cell in the distributed cell is switched between different distributed cells.

In an embodiment, a macro base station of the macro coverage cell in the distributed cell is configured to perform cooperative transmission by means of several small cells in the distributed cell, and wherein:

the macro base station is configured to perform the cooperative transmission by selecting the several small cells whose channels are not correlated and network load is low according to downlink measurement of the UE, uplink measurement of the macro base station, and network load condition of the small cells; and the distributed cell is further configured to: perform uplink by aggregating radio frequency data, intermediate frequency data or baseband data of the small cell in the cooperative transmission into related modules of the macro base station for processing, and the processed uplink data is transmitted via the S1 interface of the macro base station; and perform downlink by transmitting baseband data to the small cell in the cooperative transmission for implementing conversion of the baseband data to radio frequency signal.

In an embodiment, the threshold is 10.

According to yet another aspect, the present disclosure provides a computer program and a carrier thereof, the computer program including program instructions, when executed by a networking device of access network, causing the networking device to perform the method for implementing networking of access network described above.

According to still another aspect, the present disclosure provides an apparatus for implementing networking of an access network, including: a processor; and a memory configured to store instructions executable by the processor; wherein the processor is configured to perform: implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell; wherein the neighboring cells include another distributed cell, a conventional cell.

According to yet still another aspect, the present disclosure provides a non-transitory computer-readable storage medium having stored therein instructions that, when executed by a processor of a networking device, causes the networking device to perform a method for implementing networking of an access network, the method including: implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell; wherein the neighboring cells include another distributed cell, a conventional cell.

The technical solution of the disclosure includes: implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell; wherein the neighboring cells comprise another distributed cell and a conventional cell. According to the disclosure compared to related art, through networking plan and management on dense small cells within the range covered by the macro coverage cell, in which the small cells within the distributed cell are connected with each other though the macro coverage cell corresponding to the distributed cell, the connection links of S1 interface between small cells and the CN can be reduced, cost of network building can be saved, and problems of network interconnection caused by increase in small cells distribution can be alleviated.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are provided for further understanding the technical solution of the present application and which form a part of the specification, are used in conjunction with the embodiments of the present application to explain the technical solution of the present application and do not constitute a limitation on the technical scope of the present application.

DETAILED DESCRIPTION

For further clarifying the purpose, technical solution and advantages of the present application, the embodiments of the present application will be described in detail hereinafter with reference to the accompanying drawings. It is to be noted that the features of the embodiments and examples in the present application may be combined with each other without conflict.

Figure 1:
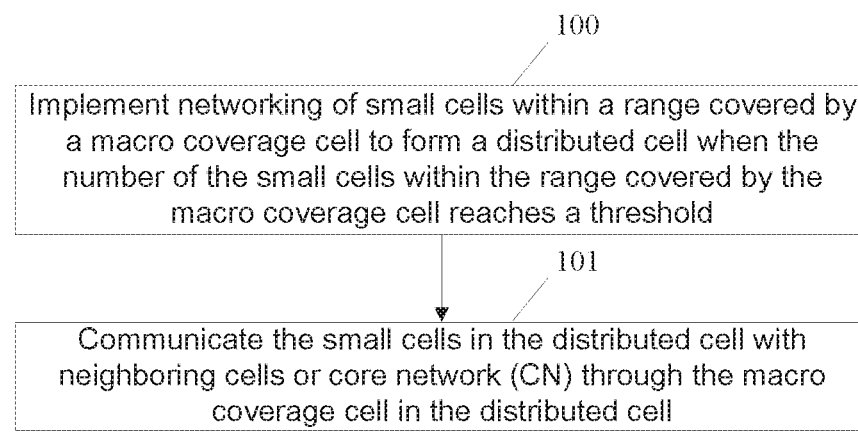
FIG. 1 is a flow chart illustrating a method for implementing networking of an access network according to the present disclosure.

FIG. 1 is a flow chart illustrating a method for implementing networking of an access network according to the present disclosure. As shown in FIG. 1, the method includes following steps.

In step 100, networking is implemented on small cells within a range covered by a macro coverage cell to form a distributed cell when number of the small cells within the range covered by the macro coverage cell reaches a threshold.

It should be noted that, the distributed cell configured by the method according to embodiments of the disclosure refers to a logical networking partition.

Preferably, the threshold set for the number of small cells is 10. Herein, the threshold set for the number of small cells is a reference value obtained from statistical experience of the person skilled in the art and, thus, can be adjusted accordingly as proper.

In an embodiment, the macro coverage cell is connected with each small cell within the distributed cell via an X2 interface; each small cell is connected and communicates with the conventional cell or CN through the macro coverage cell; the small cells in a same distributed cell is connected with each other through the macro coverage cell base station where the distributed cell is located at; there is no direct interconnection between any two small cells;

the distributed cell is connected with another distributed cell via an X2 interface connection; and the distributed cell is connected with the conventional cell or CN via an S1 interface of the macro coverage cell base station where the distributed cell is located at.

It should be noted that said conventional cell refers to those macro coverage cells and small cells in the network which are not subject to the method for implementing networking of distributed cells.

In step 101, the small cells in the distributed cell are communicated with neighboring cells or the CN through the macro coverage cell in the distributed cell.

In an embodiment, the neighboring cells include another distributed cell and/or a conventional cell.

A return bandwidth of the macro coverage cell is determined by radio resource condition of respective small cells in the distributed cell. It should be noted that, the return bandwidth of the macro coverage cell is determined according to an accumulative result obtained from the radio resource condition of respective small cells in the distributed cell. However, the manner for such determination based on the radio resource condition of respective small cells is well known for those skilled in the art and, thus, will not be elaborated herein.

According to the embodiments, the connection links of S1 interface between the increasing small cells and the CN can be reduced through networking plan and management on dense small cells within the range covered by the macro coverage cell. There is no direct interconnection between small cells or between each small cell base station and CN in the distributed cell logically divided. Instead, the small cells within the distributed cell are connected with each other though the macro coverage cell corresponding to the distributed call, and connected with the CN or another neighboring cell through the macro coverage cell, such that the cost of network building can be saved and problems of network interconnection caused by the increase in small cells distribution can be alleviated.

In an embodiment, the distributed cell further includes a backup macro coverage cell for hot spare, and the method of the disclosure further includes that the backup macro coverage cell and the macro coverage cell in the distributed cell work simultaneously.

It should be noted that, connection configuration and work process of the backup macro coverage cell in the system are exactly the same as that of the macro coverage area, such that the hot spare can be realized.

It should be noted that, reliable communication of the distributed cell can be guaranteed through the backup macro coverage area.

In an embodiment, a macro base station of the distributed cell is configured to establish an X2 data transmission channel between the macro base station and a small base station when a user equipment (UE) initiates a service in the small cell of the distributed cell. Data transmission from the UE at the small cell back to CN is performed by routing through a back transmission link of macro base station via the already established X2 channel.

In an embodiment, transmission of data stream is performed by the macro coverage cell in the distributed cell when a UE of the small cell in the distributed cell is switched between different distributed cells.

In an embodiment, the method of the disclosure further includes that a macro base station of the macro coverage cell in the distributed cell performs cooperative transmission by means of several small cell base stations in the distributed cell. In an embodiment, the cooperative transmission includes:

the macro base station performs the cooperative transmission by selecting the several small cells whose channels are not correlated and network load is low according to downlink measurement of the UE, uplink measurement of the macro base station, and network load condition of the small cells; and uplink of the distributed cell is performed by aggregating radio frequency data, intermediate frequency data or baseband data of the small cells in cooperative transmission into related modules of the macro base station for processing, and the processed uplink data is transmitted via the S1 interface of the macro base station; and downlink of the distributed cell is performed by transmitting baseband data to each small cell in cooperative transmission for implementing conversion of the baseband data to radio frequency signal.

It is to be noted that it is a conventional technique for those skilled in the art to select the small cells whose channel are not correlated and network load is low and, thus, will not be elaborated herein. The uplink of the distributed cell, which is performed by aggregating radio frequency data, intermediate frequency data or baseband data of the small cell in cooperative transmission into related modules of the macro base station for processing, is implemented as follows. When data of the small cell in cooperative transmission is radio frequency data, the radio frequency data is aggregated into a related module of the macro base station for processing radio frequency data. When the data is intermediate frequency data, the intermediate frequency data is aggregated into a related module of the macro base station for processing intermediate frequency data. When the data is baseband data, the baseband data is aggregated into a related module of the macro base station for processing baseband data. Specific processing methods are well known to those skilled in the art and, thus, will not be elaborated here. Through the uplink data processing, the processed uplink data can be transmitted uniformly via the S1 interface of the macro base station, which is conducive to unified scheduling of data in the wireless communication network.

Figure 2:
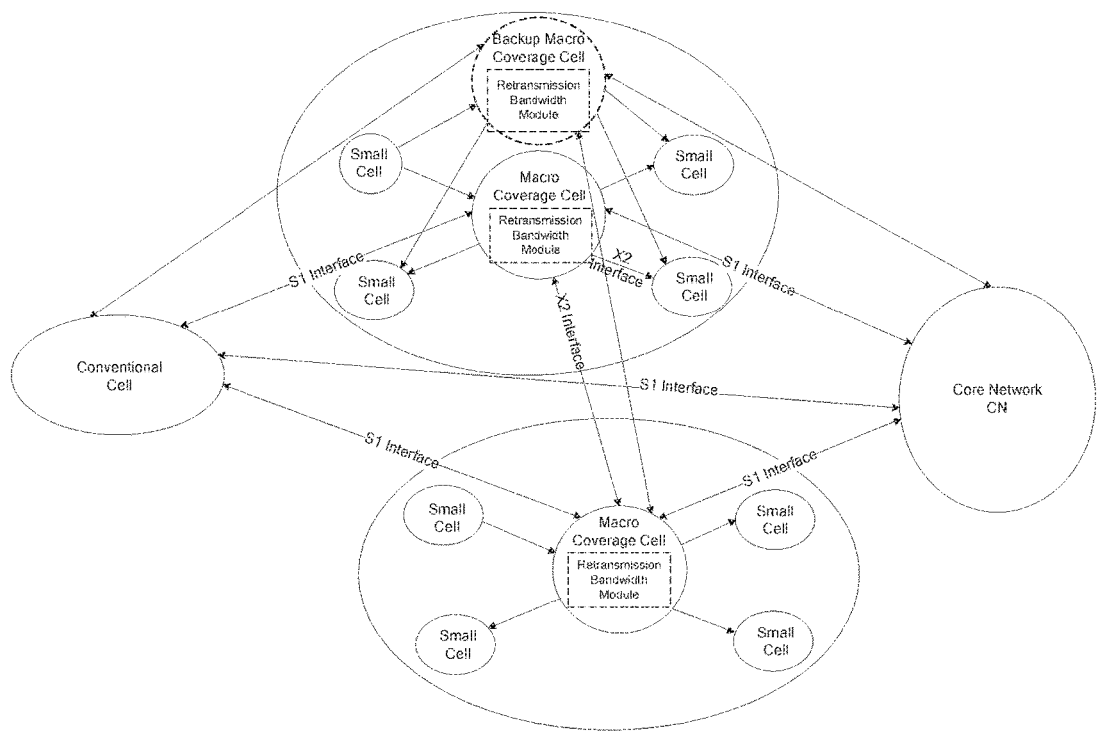
FIG. 2 is a block diagram illustrating a structure of an access network system according to the present disclosure.

FIG. 2 is a block diagram illustrating a structure of an access network system according to the present disclosure. As shown in FIG. 2, the system includes a distributed cell, neighboring cells of the distributed cell and CN.

In an embodiment, the distributed cell is formed by implementing networking of a macro coverage cell and small cells within a range covered by the macro coverage cell, where the number of the small cells within the range covered by the macro coverage cell reaches a threshold. The small cells within the distributed cell may communicate with the neighboring cells and CN through the macro coverage cell within the distributed cell. In an embodiment, both a macro base station of the macro coverage cell and a small base station of the small cell may include a wireless transceiver.

The neighboring cells communicate with the small cells in the distributed cell through the macro coverage cell in the distributed cell; and the CN communicates with the small cells in the distributed cell through the macro coverage cell in the distributed cell.

In an embodiment, the neighboring cells include another distributed cell and/or a conventional cell.

In an embodiment, the macro coverage cell is connected with the small cell within the distributed cell via an X2 interface; the small cell is connected and communicates with the conventional cell or CN through the macro coverage cell; the small cells in a same distributed cell is connected with each other through the macro coverage cell base station where the distributed cell is located at; there is no direct interconnection between any two small cells;

the distributed cell is connected with the another distributed cell via an X2 interface; and the distributed cell is connected with the conventional cell or CN via an S1 interface of the macro coverage cell.

The macro coverage cell may further include a return bandwidth module configured to determine a return bandwidth according to radio resource condition of respective small cells in the distributed cell.

The distributed cell may further include a backup macro coverage cell for hot spare which is configured to work simultaneously with the macro coverage cell in the distributed cell. A backup macro coverage cell corresponding to one of distributed cells is illustrated in the drawing.

In an embodiment, a macro cell is configured such that a macro base station thereof is in charge of establishing an X2 data transmission channel between the macro base station and a small base station when a UE initiates a service in the small cell of the distributed cell. Data transmission from the UE at the small cell back to CN is performed by routing through a back transmission link of macro base station, through which the data is returned to CN, via the X2 channel described above.

The macro coverage cell may be further configured to perform transmission of data stream when a user equipment UE of the small cell in the distributed cell is switched between different distributed cells.

In an embodiment, a macro base station of the macro coverage cell in the distributed cell is configured to perform cooperative transmission by means of several small cell base stations in the distributed cell, including:

the macro base station is configured to perform the cooperative transmission by selecting several small cells whose channels are not correlated and network load is low according to downlink measurement of the UE, uplink measurement of the macro base station, and network load condition of the small cells; and the distributed cell is further configured to: perform uplink by aggregating radio frequency data, intermediate frequency data or baseband data of the small cell in the cooperative transmission into related modules of the macro base station for processing, and the processed uplink data is transmitted via the S1 interface of the macro base station; and perform downlink by transmitting baseband data to the small cell in the cooperative transmission for implementing conversion of the baseband data to radio frequency signal.

It will be understood by those of ordinary skill in the art that all or a portion of the steps of the embodiments described above may be implemented using a computer program that may be stored in a computer readable storage medium and executed on a corresponding hardware platform (e.g., a system, a devices, an apparatus, an equipment and the like). The computer program, when being executed, includes one of the steps of a method embodiment or a combination thereof.

Alternatively, all or a portion of the steps of the embodiments described above may also be implemented using an integrated circuit. For example, these steps can be separately made into several integrated circuit modules or collectively made into a single integrated circuit module. Thus, the present disclosure is not limited to any particular combination of hardware and software.

The devices/functional modules/functional units in the above embodiments may be implemented using a general purpose computing device, which may be embodied on a single computing device or may be distributed over a network consisting of a plurality of computing devices.

The devices/functional modules/functional units in the above embodiments can be stored in a computer-readable storage medium in the form of software function modules and sold or used as stand-alone products. The above-mentioned computer-readable storage medium may be a read-only memory, a disk or an optical disk.

Any person skilled in the art will appreciate that variations or substitutions are intended to fall within the scope of the invention as defined by the appended claims. Accordingly, the protection scope of the present invention should be based on the protection scope of the claims.

INDUSTRIAL APPLICABILITY

According to embodiments of the disclosure, through networking plan and management on dense small cells within the range covered by the macro coverage cell, in which the small cells within the distributed cell are connected with each other though the macro coverage cell corresponding to the distributed cell while connected with CN or other neighboring cells through the macro coverage cell, the connection links of S1 interface between small cells and the CN can be reduced, cost of network building can be saved, and problems of network interconnection caused by increase in small cells distribution can be alleviated.

What is claimed is:

1. A method for implementing networking of an access network, comprising:
    implementing networking of small cells within a range covered by a macro coverage cell to form a distributed cell when number of the small cells within the range covered by the macro coverage cell reaches a threshold; and
    communicating the small cells in the distributed cell with neighboring cells or core network CN through the macro coverage cell in the distributed cell;
    wherein the neighboring cells comprise at least one of another distributed cell and a conventional cell,
    wherein the macro coverage cell is connected with each small cell in the distributed cell via an X2 interface; the small cells are connected with each other through the macro coverage cell in the distributed cell; and the each small cell is connected and communicates with the conventional cell or CN through the macro coverage cell;

the distributed cell is connected with the another distributed cell via an X2 interface; and the distributed cell is connected with the conventional cell or CN via an S1 interface of the macro coverage cell corresponding to the distributed cell, wherein a macro base station of the distributed cell is configured to establish a data transmission channel between the macro base station and a small base station of the small cell when a user equipment UE initiates a service in the small cell of the distributed cell, wherein transmission of data stream is performed by the macro coverage cell in the distributed cell when a user equipment UE of the small cell in the distributed cell is switched between different distributed cells, and wherein a macro base station of the macro coverage cell in the distributed cell performs cooperative transmission by means of several small cells in the distributed cell, the cooperative transmission comprising:

the macro base station performs the cooperative transmission by selecting the several small cells whose channels are not correlated and network load is low according to downlink measurement of the UE, uplink measurement of the macro base station, and network load condition of the small cells; and uplink of the distributed cell is performed by aggregating radio frequency data, intermediate frequency data or baseband data of the small cells in cooperative transmission into related modules of the macro base station for processing, and the processed uplink data is transmitted via the S1 interface of the macro base station; and downlink of the distributed cell is performed by transmitting baseband data to each small cell in cooperative transmission for implementing conversion of the baseband data to radio frequency signal.

2. The method according to claim 1, wherein a return bandwidth of each macro coverage cell is determined by radio resource condition of respective small cells in the distributed cell corresponding to the macro coverage cell.

3. The method according to claim 2, wherein each distributed cell further comprises a backup macro coverage cell for hot spare, and the backup macro coverage cell and the macro coverage cell in the distributed cell work simultaneously.

4. The method according to claim 1, wherein the threshold is 10.

5. An access network system, comprising a distributed cell, neighboring cells of the distributed cell and core network CN; wherein, the distributed cell is formed by implementing networking of a macro coverage cell and small cells within a range covered by the macro coverage cell, number of the small cells within the range covered by the macro coverage cell reaching a threshold;

each small cell in the distributed cell is configured to communicate with the neighboring cells or CN through the macro coverage cell in the distributed cell;

the neighboring cells are configured to communicate with the small cells in the distributed cell through the macro coverage cell in the distributed cell; and the CN is configured to communicate with the small cells in the distributed cell through the macro coverage cell in the distributed cell; and wherein the neighboring cells comprise at least one of another distributed cell and a conventional cell, wherein the macro coverage cell comprises a return bandwidth module configured to determine a return bandwidth according to radio resource condition of respective small cells in the distributed cell, wherein the system further comprises a backup macro coverage cell for hot spare configured to work simultaneously with the macro coverage cell in the distributed cell, wherein the macro coverage cell is further configured to perform transmission of data stream when a user equipment UE of the small cell in the distributed cell is switched between different distributed cells, wherein a macro base station of the macro coverage cell in the distributed cell is configured to perform cooperative transmission by means of several small cells in the distributed cell, and wherein:

the macro base station is configured to perform the cooperative transmission by selecting the several small cells whose channels are not correlated and network load is low according to downlink measurement of the UE, uplink measurement of the macro base station, and network load condition of the small cells; and the distributed cell is further configured to: perform uplink by aggregating radio frequency data, intermediate frequency data or baseband data of the small cell in the cooperative transmission into related modules of the macro base station for processing, and the processed uplink data is transmitted via the S1 interface of the macro base station: and perform downlink by transmitting baseband data to the small cell in the cooperative transmission for implementing conversion of the baseband data to radio frequency signal.

6. The access network system according to claim 5, wherein the macro coverage cell in the distributed cell is connected with each small cell in the distributed cell via an X2 interface; the each small cell is connected and communicates with the conventional cell or CN through the macro coverage cell; the small cells are connected with each other through the macro coverage cell;

the distributed cell is connected with the another distributed cell via an X2 interface; and the distributed cell is connected with the conventional cell or CN via an S1 interface of the macro coverage cell corresponding to the distributed cell.

7. The access network system according to claim 5, a macro base station of the distributed cell is configured to establish a data transmission channel between the macro base station and a small base station of the small cell when a user equipment UE initiates a service in the small cell of the distributed cell.

8. The access network system according to claim 5, wherein the threshold is 10.

9. An apparatus for implementing networking of an access network, comprising:

a processor; and a memory configured to store instructions executable by the processor;

wherein the processor is configured to perform:

implementing networking of small cells within a range covered by a macro coverage cell to form a distributed cell when number of the small cells within the range covered by the macro coverage cell reaches a threshold; and communicating the small cells in the distributed cell with neighboring cells or core network CN through the macro coverage cell in the distributed cell; wherein the neighboring cells comprises at least one of another distributed cell and a conventional cell, wherein the macro coverage cell is connected with each small cell in the distributed cell via an X2 interface; the small cells are connected with each other through the macro coverage cell in the distributed cell; and the each small cell is connected and communicates with the conventional cell or CN through the macro coverage cell;

the distributed cell is connected with the another distributed cell via an X2 interface; and the distributed cell is connected with the conventional cell or CN via an S1 interface of the macro coverage cell corresponding to the distributed cell, wherein a macro base station of the distributed cell is configured to establish a data transmission channel between the macro base station and a small base station of the small cell when a user equipment UE initiates a service in the small cell of the distributed cell, wherein transmission of data stream is performed by the macro coverage cell in the distributed cell when a user equipment UE of the small cell in the distributed cell is switched between different distributed cells, and wherein a macro base station of the macro coverage cell in the distributed cell performs cooperative transmission by means of several small cells in the distributed cell, the cooperative transmission comprising:

the macro base station performs the cooperative transmission by selecting the several small cells whose channels are not correlated and network load is low according to downlink measurement of the UE, uplink measurement of the macro base station, and network load condition of the small cells; and uplink of the distributed cell is performed by aggregating radio frequency data, intermediate frequency data or baseband data of the small cells in cooperative transmission into related modules of the macro base station for processing, and the processed uplink data is transmitted via the S1 interface of the macro base station; and downlink of the distributed cell is performed by transmitting baseband data to each small cell in cooperative transmission for implementing conversion of the baseband data to radio frequency signal.

* * * * *